(No Model.)
R. W. HUSS.
PNEUMATIC TIRE.
No. 535,206. Patented Mar. 5, 1895.
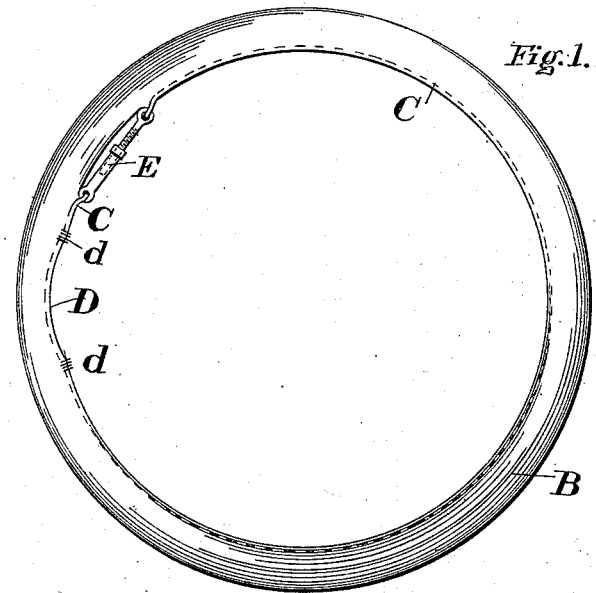
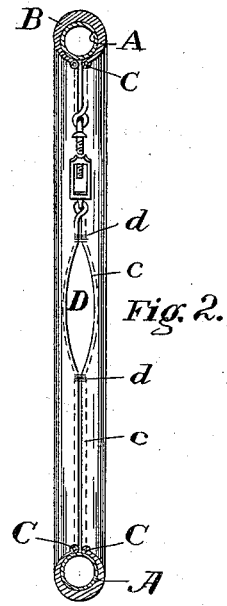
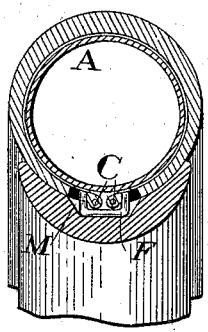
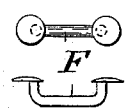
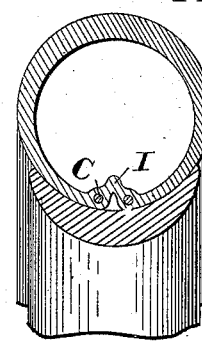
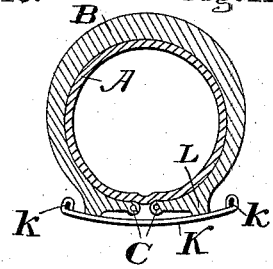
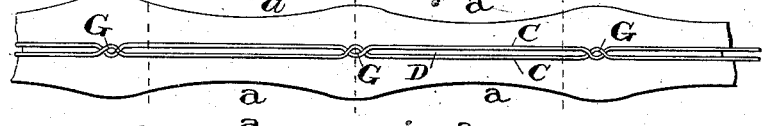
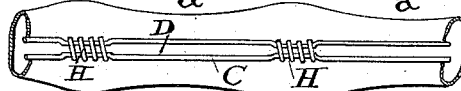
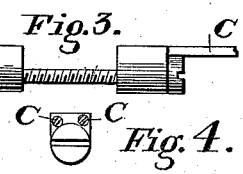
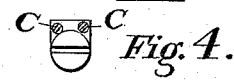
WITNESSES
Alvan Macauley
E. A. Tinnell
INVENTOR
Rudolph W. Huss.
By Wm. A. Skinkle
Attorney
THE NORRIS PETERS CO., PHOTO-LITHO., WASHINGTON, D. C.

UNITED STATES PATENT OFFICE.

RUDOLPH W. HUSS, OF CLEVELAND, OHIO.

PNEUMATIC TIRE.

SPECIFICATION forming part of Letters Patent No. 535,206, dated March 5, 1895.

Application filed June 25, 1894. Serial No. 515,620. (No model.) Patented in England November 7, 1893, No. 21,144, and in Germany December 1, 1893, No. 75,561.

*To all whom it may concern:*

Be it known that I, RUDOLPH W. HUSS, a citizen of the United States, residing at Cleveland, in the county of Cuyahoga and State of Ohio, have invented certain new and useful Improvements in Pneumatic Tires, of which the following is a specification, which will enable those skilled in the art to which my invention pertains to make and use the same.

This invention has been patented by me in the German Empire the patent being numbered 75,561, dated December 1, 1893, and issued June 6, 1894. I also filed a provisional application in Great Britain November 7, 1893, numbered 21,144.

My invention relates to pneumatic tires for vehicle wheels. Its object is to provide a means for automatically securing the tires to the rims of the wheels upon which they are used, and it consists generally in a construction of parts that will contract the circumferential length of the tire on its inner side and cause it to shrink into firm binding contact with the rim; and in such details and modifications as pertain directly to the accomplishment of the main purpose of my device.

The accompanying drawings show my invention in the best forms now known to me but some of the features might be used without the others and many changes might be made in the details thereof within the skill of a good mechanic without departing from the spirit of my invention as set forth in the claims at the end of this specification.

Figure 1, is a side elevation of a wheel tire embodying a form of my invention. Fig. 2, is a transverse section of the same. Figs. 3 and 4, are detailed views of a modification of the device by means of which I adjust the length of the contracting binding wires constituting a feature of my invention. Fig. 5, shows a means for connecting with a button the adjacent wire-reinforced edges of a split tire cover when used with my invention. Fig. 6, shows details of the button just referred to. Fig. 7, shows a construction of tire cover provided along its inner edges with my binding wires or cords which are crossed or interlocked at intervals, the tire being shown in a deflated condition. Fig. 8, is a corresponding view of the same construction showing the tire inflated and fully expanded as in use on a wheel. Fig. 9, shows a construction in which the binding wires at the edges of the cover extend substantially parallel around the entire inner circumference of the tire but are united at intervals by cross ties of thread or wire, or buttons such as are shown in Figs. 5 and 6 may be used instead of the threads or wires. Fig. 10, shows in cross section the construction of what is known as a "hose pipe tire" with my binding wires incorporated therein. Fig. 11, shows an improvement or modification of my tire which may be used to advantage with some constructions of rims.

The essential feature of my invention consists in incorporating in the inner side of the tire or tire cover a pair of wires, cords of some non stretching material, which extend around the entire inner circumference of the tire and which are united to each other at suitable intervals leaving one or more spaces between the points of connection throughout which spaces the wires are expanded sidewise or forced apart by the inflation of the tire so as to form lens shaped openings thus contracting the general circumferential length of the tire on its inner side. This may be accomplished by molding into, stitching or otherwise attaching the wires or cords to the edges of the protective cover of a tire employing an independent air tube, or in the case of a "hose pipe tire" as shown in Fig. 10, the wires or cords may be incorporated by molding or otherwise attaching in any suitable manner to the body of the tire on its inner side; in either case the wires or cords being connected at suitable intervals to form the lens shaped openings between them when the tire is expanded by air pressure, the wires normally occupying a circumference around the wheel which is reduced by forcing one or more sections of them apart sidewise.

In Figs. 1 and 2, I show a tire composed of an inner air tube A, enveloped by an outer cover B, split along its inner circumference. In each edge of this cover I incorporate wires or cords C, non-stretchable lengthwise but flexible sidewise. These wire or cord reinforced edges are connected throughout their lengths by stitching c, or in any other suitable manner except the portion D, between the points d, d, where I prefer to make the cross connections stronger than elsewhere. This construction leaves but the single opening D, where the wires may be forced apart by the air pressure of the inner tube. When the tire is thus constructed to have a single opening or space between the edges, the shortening of the circumference by reason of the lateral displacement or forcing out of alignment of so small a portion of the wires while sufficient to effect the binding of the tire to the rim is so slight that the length of the wires must be just right to fit the rim and I therefore provide a turnbuckle E, in each wire by means of which their lengths may be carefully adjusted.

In Figs. 3 and 4 I show another form of screw adjusting device to accomplish this purpose which will be readily understood without extended description.

In Fig. 5, I show the two edges of a tire cover connected by a double button F, the details of which are shown in Fig. 6. This is to illustrate one of the many devices which may be used to connect the two wires or cords at intervals as before described.

In Fig. 7, is shown a tire cover with the edges reinforced by wires or cords, which, instead of being tied or coupled together at intervals by additional devices of any kind are simply crossed and interlocked as shown at G. In this figure the tire is shown as deflated in which condition its sides are pinched or contracted in area as at a, between the connecting points of the wires to compensate for the spread of the wires and expansion of the cover when it is under inflation, in which condition, as ready for use the sides are blown out to produce even parallel lines as shown in Fig. 8.

In Fig. 9, the wires are connected by cross ties or wrappings H, of wire or thread as shown.

In Fig. 10, I show my binder wires as applied to a hose pipe tire. This figure is a cross section of the tire taken through the space between the cross connections of the binder wires. These wires C, are shown as preferably molded into the fabric of the tire tube. Between the wires I form an air tight connection either by making the web of pure rubber so that it may stretch to allow of the separation of the wires between their points of juncture or by forming a loose pucker, I, of surplus material as shown in Fig. 10 which will allow of the separation of the wires to an extent sufficient for the purpose of my invention without permitting the air to escape.

A tire made in accordance with my invention may be applied to a rim made perfectly flat on its tread surface or the rim K, may be slightly concaved as shown in Fig. 11. With these forms I prefer to use flanges or ledges k, along each edge of the rims and to mold corresponding beads L, on the tires the flanges acting as guides or stops against which the beads rest when the tires are expanded. This insures the seating of the tires in proper alignment on the rims.

When buttons or similar devices are used to connect the binder wires as shown in Fig. 5, the rims are preferably provided with recesses or cross pockets M, for their reception. The pockets allow the shanks of the buttons to fit into the rim so that the tire lies flat and snugly against it and they also by reason of their hold on the buttons prevent the tires from "creeping" on the rims when in use. When the rims are of metal these pockets or recesses may be formed when the rim is rolled or in any other desired manner, but when wooden rims are used as shown in Fig. 5, they may be formed by simply gouging out some of the material at the proper points.

In the manufacture of my tires or tire covers I prefer to lay in the wires or to form the wire bound edges with a lens shaped opening or a series of lens shaped openings between them so that their normal shape is nearly like that which will be assumed when the tires are on the rims and charged with compressed air. This will make the natural circumference of the tires of the same diameter or may be of a somewhat smaller diameter than the rims upon which they are to fit but the shape of the openings gives the inner circumference of the tires some longitudinal elasticity which will permit of their being stretched to a sufficient degree to place them in position on the rim. When thus constructed the wires normally tend to expand away from each other and to naturally assume the shape into which they are forced by the air pressure this tendency aiding to produce the general effect sought to be accomplished by my invention.

Having thus described my invention, what I claim as new and useful, and desire to secure by Letters Patent, is—

1. In a pneumatic tire the combination of a tire or tire cover with two circumferential non-stretchable wires or cords incorporated in the inner side thereof, the wires or cords being connected to each other at intervals to leave one or more elongated spaces between the points of connection in which spaces the wires are pressed apart transversely by the air pressure in the tire substantially as and for the purpose hereinbefore set forth.

2. In a pneumatic tire the combination of two non-stretchable wires or cords incorporated in the inner side of the tire and connected together at intervals so that the wires between the connected points may be forced apart transversely by the air pressure in the tire, with an elastic web or loose pucker of tire fabric crossing the space between the two wires to retain the air and yet allow of the transverse separation of the wires substantially as and for the purpose hereinbefore set forth.

3. In a pneumatic tire the combination of two non-stretchable wires or cords incorporated in the inner side of the tire and connected together at intervals substantially as and for the purpose hereinbefore set forth with beads or ledges formed on the tire and
5 wheel rim having side flanges which act as abutments or guides for the ledges on the tires as set forth.

In testimony whereof I affix my signature, in the presence of two witnesses, at Cleveland, Ohio, June 1, 1894.

RUDOLPH W. HUSS.

Witnesses:
 WM. A. SKINKLE,
 JAMES WADE.